(12) United States Patent
Chen et al.

(10) Patent No.: US 10,618,263 B2
(45) Date of Patent: Apr. 14, 2020

(54) METHOD FOR BONDING BACKSHEET

(71) Applicant: BOE TECHNOLOGY GROUP CO., LTD., Beijing (CN)

(72) Inventors: Liqiang Chen, Beijing (CN); Chen Xu, Beijing (CN); Benlian Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 154 days.

(21) Appl. No.: 15/540,813

(22) PCT Filed: May 13, 2016

(86) PCT No.: PCT/CN2016/082029
§ 371 (c)(1),
(2) Date: Jun. 29, 2017

(87) PCT Pub. No.: WO2017/133125
PCT Pub. Date: Aug. 10, 2017

(65) Prior Publication Data
US 2018/0086041 A1 Mar. 29, 2018

(30) Foreign Application Priority Data

Feb. 4, 2016 (CN) .......................... 2016 1 0081260

(51) Int. Cl.
*B32B 37/00* (2006.01)
*B32B 3/00* (2006.01)
(Continued)

(52) U.S. Cl.
CPC .............. *B32B 37/10* (2013.01); *B32B 3/266* (2013.01); *B32B 38/0004* (2013.01);
(Continued)

(58) Field of Classification Search
CPC ..... B32B 37/10; B32B 3/266; B32B 38/0004; B32B 2310/0843; B32B 2457/20; B32B 37/08; H05K 5/0017
See application file for complete search history.

(56) References Cited

U.S. PATENT DOCUMENTS 6,780,273 B1 * 8/2004 Bradford ................ A47G 1/141
156/108
2011/0109006 A1 5/2011 Zheng et al.
(Continued)

FOREIGN PATENT DOCUMENTS

CN 102050424 A 5/2011
CN 102173171 A 9/2011
(Continued)

OTHER PUBLICATIONS

Machine translation of Optronics, CN 102173171 A, Sep. 2011, 9 pages. (Year: 2011).*
(Continued)

*Primary Examiner* — Linda L Gray
(74) *Attorney, Agent, or Firm* — Calfee, Halter & Griswold LLP

(57) ABSTRACT

A method for bonding a backsheet is disclosed. The bonding is performed in two steps to ensure the bonded flexible master plate has a uniform size. The first pressure in the first bonding is smaller than the second pressure in the second bonding. A relatively small pressure is used in the first bonding to attach the backsheet to the back surface of the flexible master plate, so that the backsheet is subject to small deformation and the uniformity in size is ensured. The pressure is increased in the second bonding to exert sufficient force on the backsheet, increase firmness of attachment, and ensure that the bonded flexible master plate has a uniform size.

17 Claims, 4 Drawing Sheets

(51) Int. Cl.
*B32B 38/00* (2006.01)
*H05K 5/00* (2006.01)
*B32B 37/10* (2006.01)
*B32B 3/26* (2006.01)

(52) U.S. Cl.
CPC ... *B32B 2310/0843* (2013.01); *B32B 2457/20* (2013.01); *H05K 5/0017* (2013.01); *Y10T 156/1064* (2015.01); *Y10T 156/1082* (2015.01); *Y10T 156/1304* (2015.01)

(56) References Cited

U.S. PATENT DOCUMENTS

2015/0303388 A1　10/2015　Shi et al.
2016/0359137 A1　12/2016　Chen et al.

FOREIGN PATENT DOCUMENTS

| CN | 103489880 A | 1/2014 |
| CN | 103928398 A | 7/2014 |
| CN | 104658972 A | 5/2015 |
| CN | 204348724 U | 5/2015 |
| CN | 204391114 U | 6/2015 |
| KR | 20060112863 A | 11/2006 |

OTHER PUBLICATIONS

First Office Action from Chinese Application No. 201610081260.5 dated Jun. 28, 2017.
International Search Report for International Application No. PCT/CN2016/082029 dated Nov. 7, 2016.

* cited by examiner

METHOD FOR BONDING BACKSHEET

RELATED APPLICATIONS

The present application is the U.S. national phase entry of PCT/CN2016/082029, with an international filing date of May 13, 2016, which claims the benefit of Chinese Patent Application 201610081260.5, filed on Feb. 4, 2016, the entire disclosures of which are incorporated herein by reference.

TECHNICAL FIELD

The present disclosure relates to the field of display technology, and particularly to a method for bonding a backsheet.

BACKGROUND

With the development of display technique, a flexible display panel is increasingly applied in electronic apparatuses due to its excellent features of light weight, thin thickness, and resistance to impact. A display device to which the flexible display panel is applied comprises a liquid crystal display device, an organic light emitting display device, and an electrophoretic display device. A flexible display device can be applied to a smart card, a portable computer, and electronic paper. The process for fabricating the flexible display has experienced a great development currently.

During fabricating the flexible display device, generally a flexible substrate is fixed to a glass substrate, and the process for fabricating the flexible display panel is then performed. This process is compatible with the existing apparatus for fabricating a display panel. After the flexible display panel is complete, the flexible substrate is detached from the glass substrate. Then, a backsheet is attached on a back surface of the flexible substrate, to planarize the flexible substrate. Then cutting is performed. Finally, processes like Chip On Film (COF), bonding are performed.

SUMMARY

Embodiments of the present disclosure provide a method for bonding a backsheet, which solves the problem of change in size of the flexible display panel due to bonding to the backsheet.

Therefore, in an embodiment of the present disclosure a method for bonding a backsheet, comprises: attaching a backsheet to a back surface of a flexible master plate with a first pressure, wherein a front surface of the flexible master plate comprises a plurality of flexible display panel regions which are arranged in an array; and pressing the backsheet which has been attached to the back surface of the flexible master plate with a second pressure, wherein the first pressure is smaller than the second pressure.

In certain exemplary embodiments, prior to the step of attaching the backsheet to the back surface of the flexible master plate with the first pressure, the method further comprises: patterning the backsheet.

In certain exemplary embodiments, the step of patterning the backsheet comprises: cutting at regions of the backsheet to which gaps among flexible display panel regions in the flexible master plate correspond to form hollow regions or scribing streets penetrating the backsheet.

In certain exemplary embodiments, the step of cutting at regions of the backsheet to which gaps among flexible display panel regions in the flexible master plate correspond to form hollow regions or scribing streets comprises: cutting with a laser or a cutter wheel to form the hollow regions or scribing streets.

In certain exemplary embodiments, the step of attaching the backsheet to the back surface of the flexible master plate with the first pressure comprises: rolling the flexible master plate and the backsheet by a rolling mechanism with the first pressure in a first direction, wherein the flexible master plate and the backsheet are arranged between an upper working platform and a lower working platform which are oppositely engaged.

In certain exemplary embodiments, the step of pressing the backsheet which has been attached to the back surface of the flexible master plate with the second pressure comprises: rolling the flexible master plate and the backsheet by the rolling mechanism with the second pressure in the first direction, wherein the flexible master plate and the backsheet are arranged between the upper working platform and the lower working platform which are oppositely engaged.

In certain exemplary embodiments, the step of pressing the backsheet which has been attached to the back surface of the flexible master plate with the second pressure comprises: rolling the flexible master plate and the backsheet by the rolling mechanism with the second pressure in a direction opposite to the first direction, wherein the flexible master plate and the backsheet are arranged between the upper working platform and the lower working platform which are oppositely engaged.

In certain exemplary embodiments, the hollow regions or scribing streets which are formed in the backsheet are located at gaps among the flexible display panel regions.

In certain exemplary embodiments, the hollow regions or scribing streets which are formed in the backsheet are located at gaps among the flexible display panel regions which are arranged in a first direction.

In certain exemplary embodiments, the hollow regions or scribing streets which are formed in the backsheet are located at gaps among the flexible display panel regions which are arranged in a second direction, and the second direction is perpendicular to the first direction.

In certain exemplary embodiments, the hollow regions or scribing streets are only arranged at both sides of a region to which bonding regions of the flexible display panel regions correspond.

In certain exemplary embodiments, each of the hollow regions is a strip-shaped region which extends in the first direction.

In certain exemplary embodiments, the strip-shaped region has a width in the second direction, and the width increases with a decrease in elasticity modulus of the backsheet.

In an exemplary embodiment of the present disclosure a method for bonding a backsheet is provided. The bonding is performed in two steps to ensure the bonded flexible master plate has a uniform size. The first pressure in the first bonding is smaller than the second pressure in the second bonding. A relatively small pressure is used in the first bonding to attach the backsheet to the back surface of the flexible master plate, so that the backsheet is subject to small deformation and the uniformity in size is ensured. The pressure is increased in the second bonding to exert sufficient force on the backsheet, to increase firmness of attachment. Besides, prior to attaching the backsheet to the back surface of the flexible master plate, the backsheet is patterned, which increases the space for releasing stress. As a result, the stress in the backsheet is released, which ensures that the bonded flexible master plate has a uniform size.

DETAILED DESCRIPTION OF EMBODIMENTS

Specific embodiments of a method for bonding a backsheet in the present disclosure will be further described hereinafter with reference to the drawings and embodiments. The following embodiments are only used for explaining more clearly the technical solution of the present disclosure rather than limiting the protection scope of the present disclosure.

Figure 1:
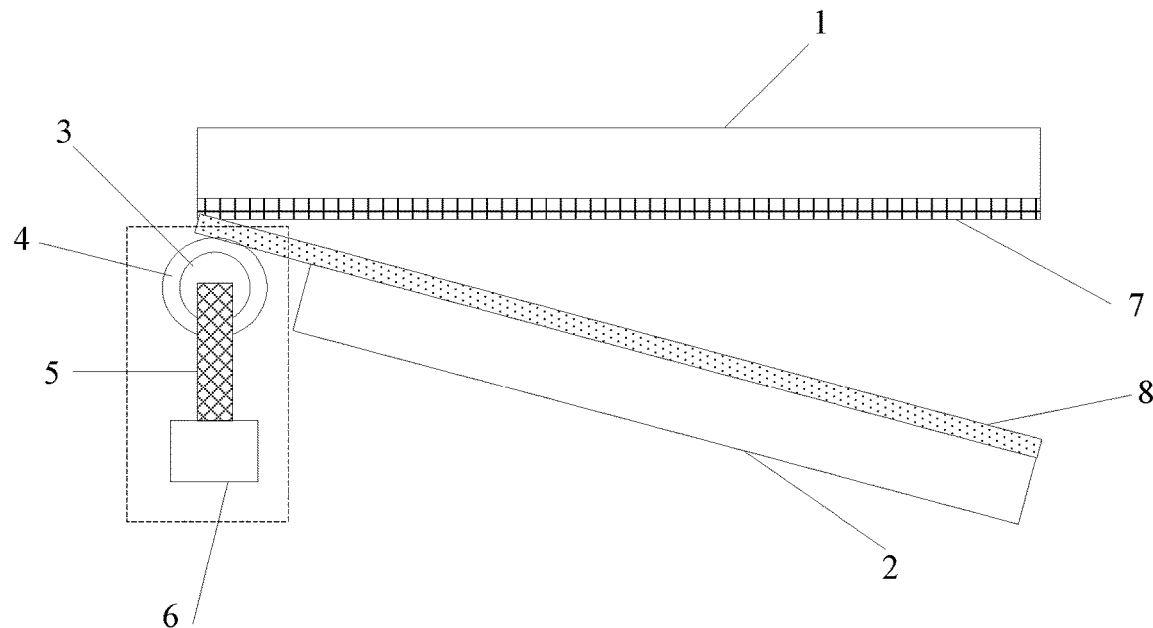
FIG. 1 is a structural diagram for illustrating a backsheet bond device.

Currently, the backsheet is generally attached by roller bonding, as shown in FIG. 1. The apparatus comprises an upper working platform 1, a lower working platform 2, and a rolling mechanism. The upper working platform 1 is used to fix a flexible substrate 7, and the lower working platform 2 is used to fix a backsheet 8. The upper working platform 1 and the lower working platform 2 are configured to flip and engage oppositely. A set of rolling mechanisms are arranged in a base of the lower working platform 2, and are capable of moving in a reciprocating manner. The rolling mechanism applies a rolling force on the flexible substrate 7 and the backsheet 8 which are fixed to the upper working platform 1 and the lower working platform 2, so that the flexible substrate 7 and the backsheet 8 are bonded together. The rolling mechanism is provided with a roller bearing 5 for fix a roller 3. The roller 3 has a roller covering 4 which is made from an elastic organic material. A cylinder 6 is arranged below a base of the roller bearing 5, and provides the pressure required for rolling the roller 3.

In the case shown in FIG. 1, when the pressure applied by the rolling mechanism is high, stress may accumulate in the flexible substrate and the backsheet, which leads to expansion of the flexible substrate 7. With an increase in size of the backsheet 8, stress accumulation is especially serious at the outer side, and the expansion force increases, which leads to a non-uniform size. The subsequent COF bonding process is sensitive to change in size. In this way, non-uniform change in size of the flexible substrate 7 leads to misalignment between the flexible substrate 7 and pads in COF during bonding. This also leads to an open circuit, and the yield is affected severely.

Figure 2:
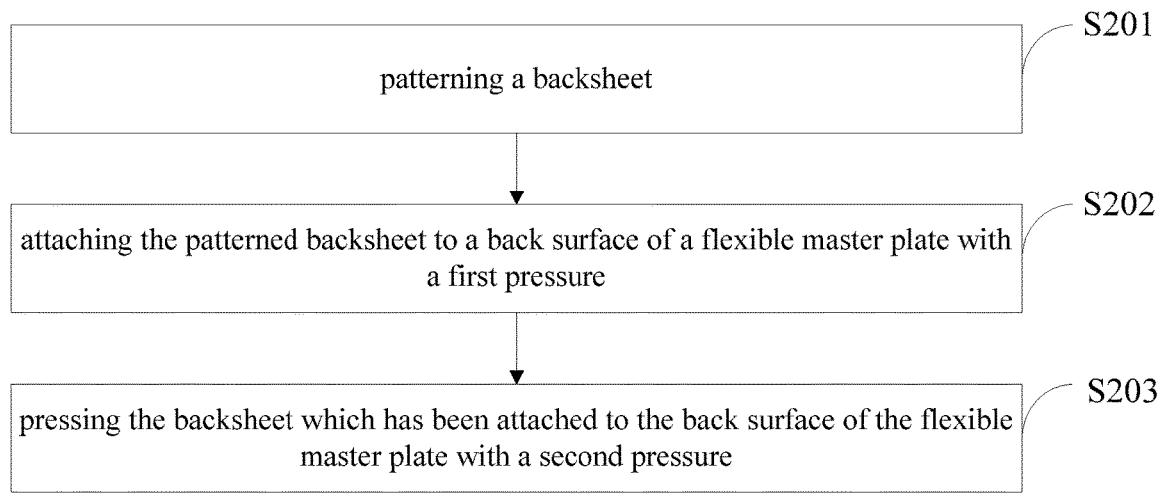
FIG. 2 is a flow chart for illustrating a method for bonding a backsheet in an embodiment of the present disclosure.

In an exemplary embodiment, as shown in FIG. 2, a method for bonding a backsheet comprises:

S201, patterning a backsheet;

S202, attaching the patterned backsheet to a back surface of a flexible master plate with a first pressure, wherein a front surface of the flexible master plate comprises a plurality of flexible display panel regions which are arranged in an array; and S203, pressing the backsheet which has been attached to the back surface of the flexible master plate with a second pressure, wherein the first pressure is smaller than the second pressure.

In an embodiment of the present disclosure, prior to attaching the backsheet to the back surface of the flexible master plate, the backsheet is patterned, which increases the space for releasing stress. Then, the bonding is performed in two steps to ensure the bonded flexible master plate has a uniform size. The first pressure in the first bonding is smaller than the second pressure in the second bonding. A relatively small pressure is used in the first bonding to attach the backsheet to the back surface of the flexible master plate, so that the backsheet is subject to small deformation and the uniformity in size is ensured. The pressure is increased in the second bonding to exert sufficient force on the backsheet, to increase firmness of attachment. Besides, the pattern of the backsheet enables the stress in the backsheet to be released, which ensures that the bonded flexible master plate has a uniform size.

In implementations, in the method according to an embodiment of the present disclosure, step S201 of patterning the backsheet comprises: cutting at regions of the backsheet to which gaps among flexible display panel regions in the flexible master plate correspond to form hollow regions. After bonding the backsheet and the flexible master plate, hollow regions are located at gaps among flexible display panel regions, and do not coincide with flexible display panel regions. In this way, after the flexible master plate is cut subsequently to form respective flexible display panel, the hollow regions are cut away, so that they will not affect the quality of the resulting flexible display panel.

In implementations, cutting at regions of the backsheet to which gaps among flexible display panel regions in the flexible master plate correspond to form hollow regions is realized as follow. The hollow regions may be formed in the backsheet by laser cutting. Alternatively, the hollow regions may be formed in the backsheet by a cutter wheel.

In implementations, the step S202 of attaching the patterned backsheet to the back surface of the flexible master plate with the first pressure can be implemented by the device shown in FIG. 1. Namely, the flexible master plate and the backsheet are rolled by a rolling mechanism with the first pressure in a first direction, and the flexible master plate and the backsheet are arranged between an upper working platform and a lower working platform which are oppositely engaged. The first direction can be a direction from left to right. Namely, the rolling mechanism rolls the working platform with the first pressure from left to right.

Accordingly, in implementations, the step S203 of pressing the backsheet which has been attached to the back surface of the flexible master plate with the second pressure comprises rolling the flexible master plate and the backsheet by the rolling mechanism with the second pressure in the first direction, wherein the flexible master plate and the backsheet are arranged between the upper working platform and the lower working platform which are oppositely engaged. Namely, the rolling mechanism rolls the working platform from left to right with the second pressure which is different from the first pressure.

In an alternative embodiment, the step S203 of pressing the backsheet which has been attached to the back surface of the flexible master plate with the second pressure may comprise rolling the flexible master plate and the backsheet by the rolling mechanism with the second pressure in a direction opposite to the first direction, wherein the flexible master plate and the backsheet are arranged between the upper working platform and the lower working platform which are oppositely engaged. Namely, the same rolling mechanism as the first bonding is used, a pressure of the cylinder is adjusted to the second pressure, and the rolling mechanism rolls the working platform from right to left.

In an exemplary embodiment, the same (group of) rolling mechanism is used to performed step S202 and S203. In an alternative embodiment, different (groups of) rolling mechanisms are used to step S202 and S203, as long as the first pressure in step S202 is smaller than the second pressure in step S203.

Figure 3A:
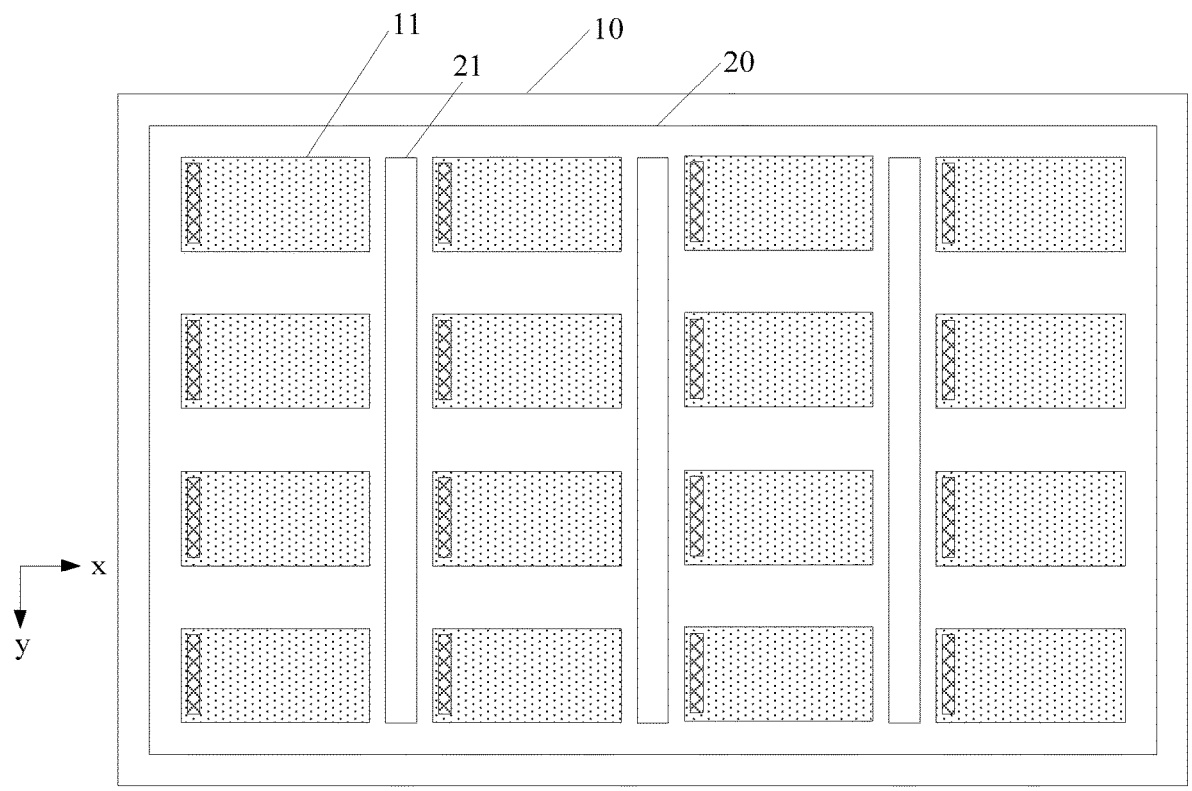
FIG. 3A, FIG. 3B and FIG. 3C are structural diagrams for illustrating the bonded flexible master plate and backsheet bond in a method for bonding a backsheet in an embodiment of the present disclosure.
Figure 3B:
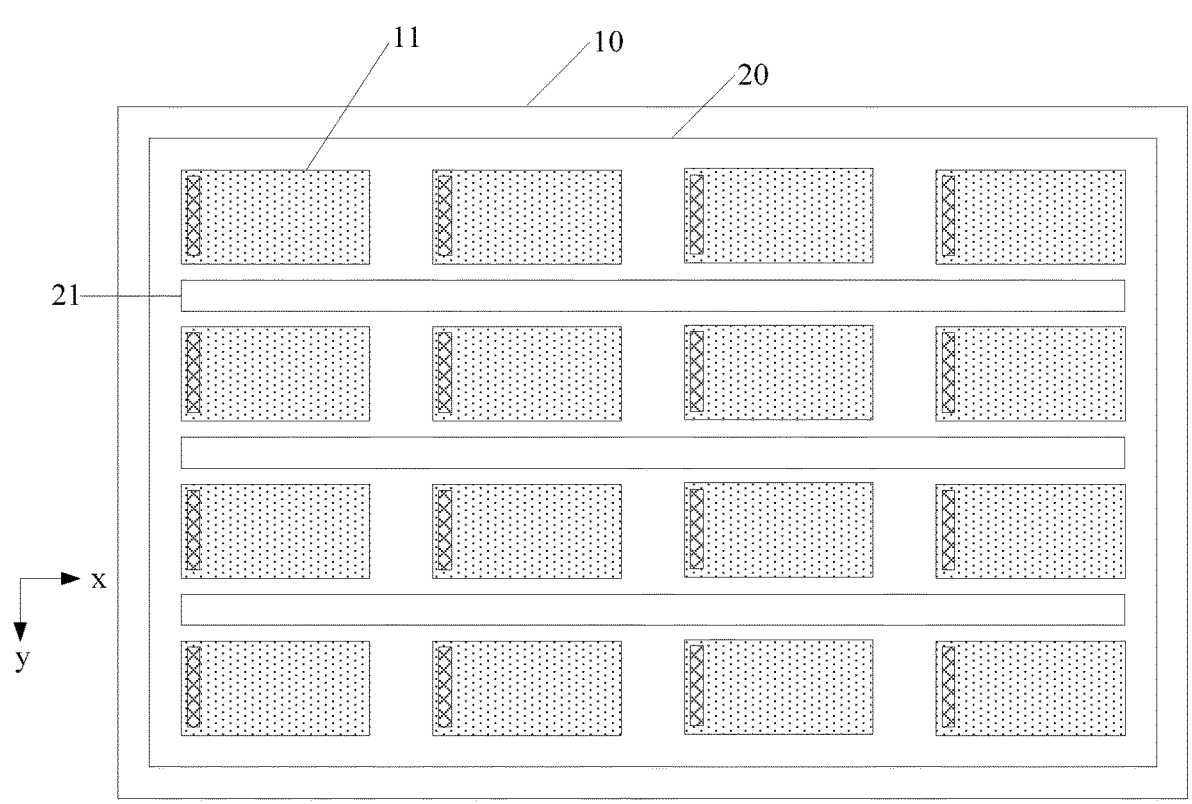
Figure 3C:
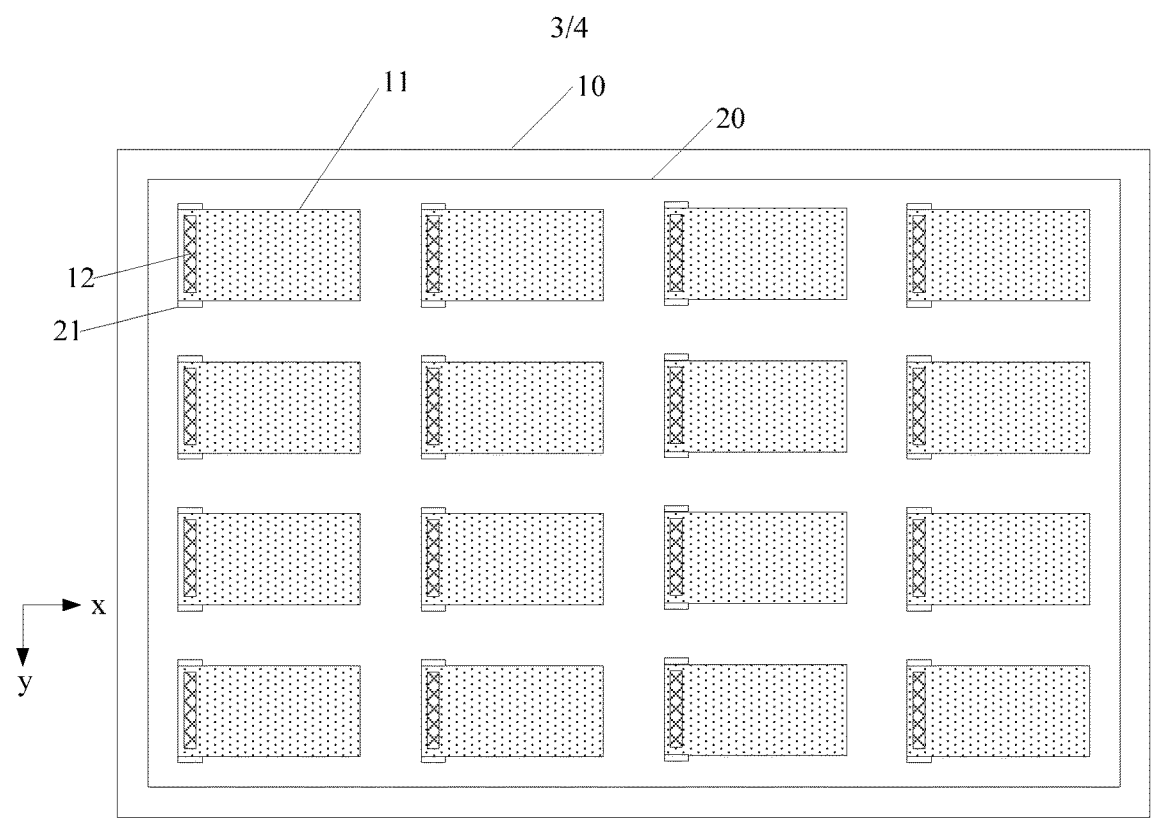

As shown in FIG. 3A, FIG. 3B and FIG. 3C, the backsheet 8 comprises patterned hollow regions 21, which are located at gaps among flexible display panel regions 11. These hollow regions 21 provide a space for releasing stress, so that stress accumulated in the backsheet during bonding is released, which ensures that the bonded flexible master plate has a uniform size. Besides, since the hollow regions 21 are arranged at gaps among flexible display panel regions 11, the process for forming these hollow regions 21 will not adversely affect the flexible display panel regions 11.

In an exemplary embodiment, as shown in FIG. 3A, the hollow regions 21 formed in the backsheet 20 extend in y direction, and are located at gaps among flexible display panel regions 11 which are arranged in x direction. During bonding the backsheet, the hollow regions provide a space for releasing stress.

Figure 4:
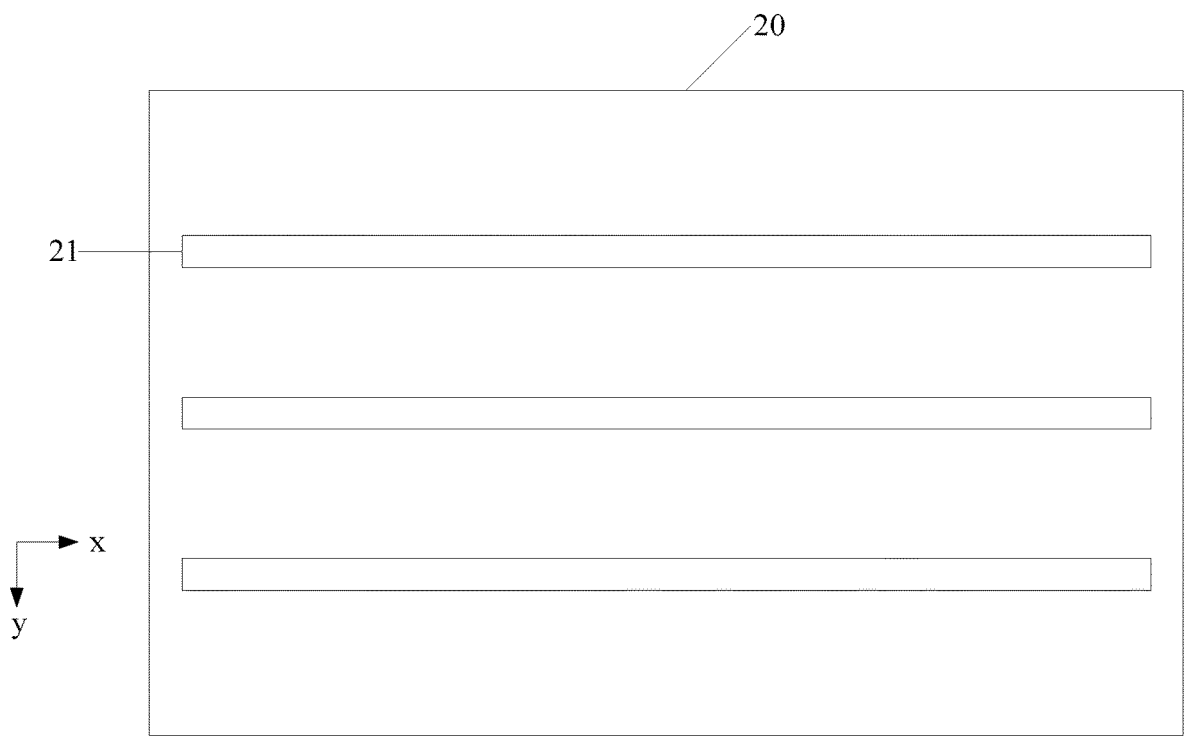
FIG. 4 and FIG. 5 are structural diagrams for illustrating a backsheet which is used in a method for bonding a backsheet in an embodiment of the present disclosure.

In an exemplary embodiment, both the first bonding in step S202 and the second bonding in step S203 are performed by rolling. On basis of this, in case the backsheet in step S201 comprises patterned hollow regions, it is required to arrange the hollow regions according to the rolling direction during bonding, so as to better release stress during bonding. As shown in FIG. 3B and FIG. 3C, the hollow regions 21 formed in the backsheet 20 are located at gaps among flexible display panel regions 11 which are arranged in the second direction. The second direction is perpendicular to the first direction. Namely, in case the first direction is x direction, the second direction is y direction. The hollow regions 21 of the backsheet 20 are arranged at gaps among flexible display panel regions 11 in neighboring columns in the flexible master plate 10. In implementations, as shown in FIG. 4, each of the hollow regions 21 can be a strip-shaped region extending in the first direction, i.e., a strip-shaped region extending in x direction. In this case, the hollow regions 21 are arranged in the second direction, i.e., y direction.

In implementations, the hollow regions 21 have a size which changes with the material of the backsheet. In case the backsheet has a good expansion property, the hollow regions may have a large size. In case the backsheet has a poor expansion property, the hollow regions may have a small size. Namely, the strip-shaped region has a width in the second direction (i.e., y direction), and the width increases with a decrease in elasticity modulus of the backsheet.

Figure 5:
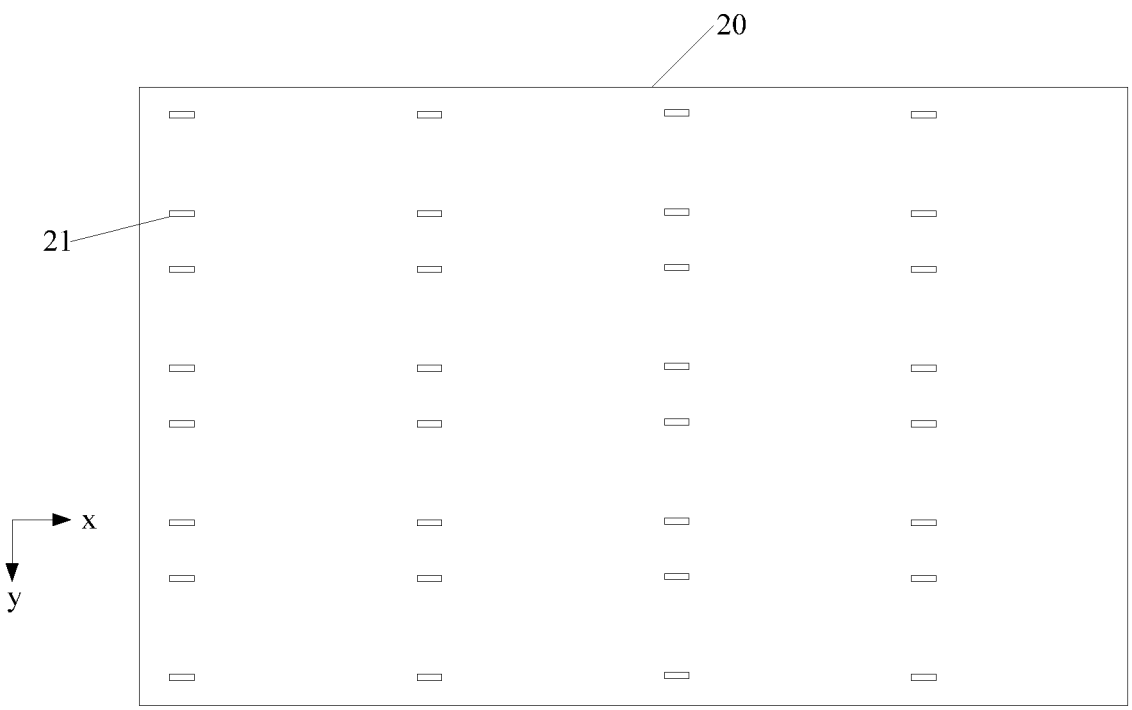

In an embodiment of the present disclosure, since the change in size of the flexible display panel has the most prominent effect at the bonding region of COF, the patterning is only performed at a region of the backsheet which is close to the bonding region. As shown in FIG. 3C and FIG. 5, the hollow regions 21 are only arranged at both sides of the bonding region 12 to which bonding regions of the flexible display panel regions 11 correspond, thus releasing the stress in the bonding region during pressing.

In the above embodiments, patterning of the backsheet 8 has been described in which hollow regions 21 are formed.

However, it will be appreciated that the purpose of patterning the backsheet is to provide a space for releasing stress, so that the stress accumulated in the backsheet during bonding is released. Apart from the strip-shaped hollow regions 21 in FIG. 3A, FIG. 3B and FIG. 3C, the patterning for example comprises forming scribing streets at regions in the backsheet 8 to which gaps among flexible display panel regions in the flexible master plate correspond. The scribing streets penetrate the backsheet 8. In an exemplary embodiment, the scribing streets have a linear shape. The scribing streets are formed by a laser or a cutter wheel. Besides, the scribing streets may be distributed in the backsheet a similar mode with the hollow regions in FIGS. 3A, 3B and 3C, which is not repeated here for simplicity.

In an embodiment of the present disclosure, prior to attaching the backsheet to the back surface of the flexible master plate, the backsheet is patterned, which increases the space for releasing stress. Then, the bonding is performed in two steps to ensure the bonded flexible master plate has a uniform size. The first pressure in the first bonding is smaller than the second pressure in the second bonding. A relatively small pressure is used in the first bonding to attach the backsheet to the back surface of the flexible master plate, so that the backsheet is subject to small deformation and the uniformity in size is ensured. The pressure is increased in the second bonding to exert sufficient force on the backsheet, to increase firmness of attachment. Besides, the pattern of the backsheet enables the stress in the backsheet to be released, which ensures that the bonded flexible master plate has a uniform size.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. A method for bonding a backsheet comprising:
   patterning the backsheet;
   attaching the backsheet to a back surface of a flexible master plate with a first pressure, wherein a front surface of the flexible master plate comprises a plurality of flexible display panel regions which are arranged in an array; and
   pressing the backsheet which has been attached to the back surface of the flexible master plate with a second pressure, wherein the first pressure is smaller than the second pressure,
   wherein the step of patterning the backsheet comprises:
   cutting at regions of the backsheet to which gaps among flexible display panel regions in the flexible master plate correspond to form hollow regions.

2. The method of claim 1, wherein the step of cutting at regions of the backsheet to which gaps among flexible display panel regions in the flexible master plate correspond to form hollow regions comprises:
   cutting with a laser or a cutter wheel to form the hollow regions.

3. The method of claim 1, wherein the step of attaching the backsheet to the back surface of the flexible master plate with the first pressure comprises:
   rolling the flexible master plate and the backsheet by a rolling mechanism with the first pressure in a first direction, wherein the flexible master plate and the backsheet are arranged between an upper working platform and a lower working platform which are oppositely engaged.

4. The method of claim 3, wherein the step of pressing the backsheet which has been attached to the back surface of the flexible master plate with the second pressure comprises:
rolling the flexible master plate and the backsheet by the rolling mechanism with the second pressure in the first direction, wherein the flexible master plate and the backsheet are arranged between the upper working platform and the lower working platform which are oppositely engaged.

5. The method of claim 3, wherein the step of pressing the backsheet which has been attached to the back surface of the flexible master plate with the second pressure comprises:
rolling the flexible master plate and the backsheet by the rolling mechanism with the second pressure in a direction opposite to the first direction, wherein the flexible master plate and the backsheet are arranged between the upper working platform and the lower working platform which are oppositely engaged.

6. The method of claim 1, wherein the hollow regions which are formed in the backsheet are located at gaps among the flexible display panel regions.

7. The method of claim 6, wherein the hollow regions which are formed in the backsheet are located at gaps among the flexible display panel regions which are arranged in a first direction.

8. The method of claim 7, wherein the hollow regions which are formed in the backsheet are located at gaps among the flexible display panel regions which are arranged in a second direction, and the second direction is perpendicular to the first direction.

9. The method of claim 8, wherein the hollow regions are only arranged at both sides of a region to which bonding regions of the flexible display panel regions correspond.

10. The method of claim 8, wherein each of the hollow regions is a strip-shaped region which extends in the first direction.

11. The method of claim 10, wherein the strip-shaped region has a width in the second direction, and the width increases with a decrease in elasticity modulus of the backsheet.

12. A method for bonding a backsheet comprising:
patterning the backsheet;
attaching the backsheet to a back surface of a flexible master plate with a first pressure, wherein a front surface of the flexible master plate comprises a plurality of flexible display panel regions which are arranged in an array; and
pressing the backsheet which has been attached to the back surface of the flexible master plate with a second pressure, wherein the first pressure is smaller than the second pressure,
wherein the step of patterning the backsheet comprises:
cutting at regions of the backsheet to which gaps among flexible display panel regions in the flexible master plate correspond to form scribing streets penetrating the backsheet.

13. The method of claim 12, wherein the step of cutting at regions of the backsheet to which gaps among flexible display panel regions in the flexible master plate correspond to form scribing streets comprises:
cutting with a laser or a cutter wheel to form the scribing streets.

14. The method of claim 12, wherein the scribing streets which are formed in the backsheet are located at gaps among the flexible display panel regions.

15. The method of claim 14, wherein the scribing streets which are formed in the backsheet are located at gaps among the flexible display panel regions which are arranged in a first direction.

16. The method of claim 15, wherein the scribing streets which are formed in the backsheet are located at gaps among the flexible display panel regions which are arranged in a second direction, and the second direction is perpendicular to the first direction.

17. The method of claim 14, wherein the scribing streets are only arranged at both sides of a region to which bonding regions of the flexible display panel regions correspond.

* * * * *